US007639777B2

(12) United States Patent
Warner et al.

(10) Patent No.: US 7,639,777 B2
(45) Date of Patent: Dec. 29, 2009

(54) COMPUTED TOMOGRAPHY SYSTEMS AND RELATED METHODS INVOLVING FORWARD COLLIMATION

(75) Inventors: Rodney H. Warner, Austin, TX (US); Royce McKim, Austin, TX (US)

(73) Assignee: United Technologies Corp., Hartford, CT (US)

( * ) Notice: Subject to any disclaimer, the term of this patent is extended or adjusted under 35 U.S.C. 154(b) by 0 days.

(21) Appl. No.: 12/037,302

(22) Filed: Feb. 26, 2008

(65) Prior Publication Data

US 2009/0213994 A1 Aug. 27, 2009

(51) Int. Cl.
*G01N 23/00* (2006.01)

(52) U.S. Cl. ........................................ 378/19; 378/147

(58) Field of Classification Search ..................... 378/4, 378/16, 57, 58, 145, 147, 149, 19; 250/505.1, 250/515.1

See application file for complete search history.

(56) References Cited

U.S. PATENT DOCUMENTS

| | | | |
|---|---|---|---|
| 2,741,710 | A | 4/1956 | Bartow et al. |
| 4,054,800 | A | 10/1977 | Leask |
| 4,211,927 | A | 7/1980 | Hellstrom et al. |
| 4,242,587 | A | 12/1980 | Lescrenier |
| 4,453,226 | A | 6/1984 | Hobbs et al. |
| 4,521,372 | A | 6/1985 | Price et al. |
| 4,558,458 | A | 12/1985 | Katsumata et al. |
| 4,590,658 | A | 5/1986 | Funyu et al. |
| 4,636,475 | A | 1/1987 | Price et al. |
| 4,821,511 | A | 4/1989 | Felix et al. |
| 4,825,454 | A | 4/1989 | Annis et al. |
| 4,989,225 | A | 1/1991 | Gupta et al. |
| 5,131,021 | A | 7/1992 | Gard et al. |
| 5,222,114 | A | 6/1993 | Kamata et al. |
| 5,430,298 | A | 7/1995 | Possin et al. |
| 5,550,378 | A | 8/1996 | Skillicorn et al. |
| 5,555,283 | A | 9/1996 | Shiu et al. |
| 5,799,057 | A | 8/1998 | Hoffman et al. |
| 5,889,834 | A | 3/1999 | Vilsmeier et al. |
| 5,982,846 | A | 11/1999 | Toth et al. |
| 5,991,357 | A | 11/1999 | Marcovici et al. |
| 6,167,110 | A | 12/2000 | Possin et al. |
| 6,188,748 | B1 | 2/2001 | Pastyr et al. |
| 6,229,872 | B1 | 5/2001 | Amos |
| 6,487,267 | B1 | 11/2002 | Wolter |
| 6,639,964 | B2 | 10/2003 | Schneider et al. |

(Continued)

FOREIGN PATENT DOCUMENTS

JP 60256034 12/1985

(Continued)

OTHER PUBLICATIONS

"Scientific Papers", Molecular Imaging and Biology, vol. 8, No. 2, Mar. 1, 2006, pp. 49-123.

(Continued)

*Primary Examiner*—Jurie Yun

(57) ABSTRACT

Computed tomography (CT) systems and related methods involving forward collimation are provided are provided. In this regard, a representative method involving forward collimation of X-rays includes: emitting X-rays from a housing in which an X-ray source is mounted; collimating the X-rays downstream of the housing; and directing the collimated X-rays at a target.

13 Claims, 4 Drawing Sheets

U.S. PATENT DOCUMENTS

| | | | |
|---|---|---|---|
| 6,868,138 | B2 | 3/2005 | Clinthorne et al. |
| 6,879,715 | B2 | 4/2005 | Edic et al. |
| 6,925,140 | B2 | 8/2005 | Bruder |
| 6,934,642 | B2 | 8/2005 | Berry et al. |
| 6,979,826 | B2 | 12/2005 | Ikhlef |
| 7,095,028 | B2 | 8/2006 | Mollov et al. |
| 7,099,435 | B2 | 8/2006 | Heumann et al. |
| 7,115,876 | B2 | 10/2006 | Ren et al. |
| 7,120,282 | B2 | 10/2006 | Langan |
| 7,133,491 | B2 * | 11/2006 | Bernardi et al. ............... 378/57 |
| 7,185,662 | B2 | 3/2007 | Succop |
| 7,187,800 | B2 | 3/2007 | Hibbard |
| 7,188,998 | B2 | 3/2007 | Gregerson et al. |
| 7,204,019 | B2 | 4/2007 | Ducotey, Jr. et al. |
| 7,216,694 | B2 | 5/2007 | Otero et al. |
| 7,221,737 | B2 | 5/2007 | Hoheisel et al. |
| 7,236,564 | B2 | 6/2007 | Hopkins et al. |
| 7,253,608 | B2 | 8/2007 | Martin et al. |
| 7,254,209 | B2 | 8/2007 | Zhao et al. |
| 7,272,207 | B1 | 9/2007 | Aufrichtig et al. |
| 7,283,605 | B2 | 10/2007 | Sainath et al. |
| 7,283,616 | B2 | 10/2007 | Freund et al. |
| 7,286,636 | B2 * | 10/2007 | Unger et al. .................. 378/62 |
| 7,341,376 | B2 | 3/2008 | Birdwell |
| 2006/0133565 | A1 | 6/2006 | Takagi et al. |
| 2008/0075227 | A1 | 3/2008 | Christoph et al. |

FOREIGN PATENT DOCUMENTS

| | | | |
|---|---|---|---|
| JP | 05309088 | | 11/1993 |
| JP | 06-237927 | * | 8/1994 |
| JP | 08187239 | | 7/1996 |

OTHER PUBLICATIONS

Sun et al., "X-Ray Microcomputed Tomography for Measuring Polymerization Shrinkage of Polymeric Dental Composites", Dental Materials, vol. 24, No. 2, Dec. 26, 2007, pp. 228-234.

Johnson et al., "Virtual Histology of Transgenic Mouse Embryos for High-Throughput Penotyping", PLOS Genetices, vol. 2, No. 4, Apr. 2006, pp. 471-477.

Dufresne, T. "Segmentation Techniques for Analysis of Bone by Three-Dimensional Computed Tomographic Imaging", Technology and Health Care, vol. 6, No. 5/06, Dec. 1, 1998, pp. 351-359.

Kai Wang et al. "Surface Detection With Subvoxel Accuracy Using Facet Model and IDDG Operator", Computer-Aided Industrial Design and Conceptual Design, 2006, Nov. 17, 2006, pp. 1-5.

Andrew Burghardt et al. "A Local Adaptive Threshold Strategy for High Resolution Peripheral Quantitative Computer Tomography of Trabecular Cone", Annals of Biomedical Engineering, vol. 35, No. 10, Jun. 30, 2007, pp. 1678-1686.

Oh W et al. "Image Thresholding by Indicator Kriging", IEE Transactions on Pattern Analysis and Machine Intelligence, vol. 21, No. 7, Jul. 1, 1999, pp. 590-602.

* cited by examiner

COMPUTED TOMOGRAPHY SYSTEMS AND RELATED METHODS INVOLVING FORWARD COLLIMATION

BACKGROUND

1. Technical Field

The disclosure generally relates to non-destructive inspection of components.

2. Description of the Related Art

Computed tomography (CT) involves the use of X-rays that are passed through a target. Based on the amount of X-ray energy detected at a detector located downstream of the target, information about the target can be calculated. By way of example, representations of target shape and density in three dimensions can be determined.

SUMMARY

Computed tomography systems and related methods involving forward collimation are provided. In this regard, an exemplary embodiment of a computed tomography system comprises: a housing defining an interior and having an X-ray source located within the interior; and a forward collimator positioned downstream of the housing, the forward collimator being formed of X-ray absorbing material with channels formed therethrough, the channels being aligned with the X-ray source.

An exemplary embodiment of a method involving forward collimation of X-rays comprises: emitting X-rays from a housing in which an X-ray source is mounted; collimating the X-rays downstream of the housing; and directing the collimated X-rays at a target.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Computed tomography (CT) systems and related methods involving forward collimation are provided, several exemplary embodiments of which will be described in detail. In this regard, CT involves passing X-rays through a component and measuring attenuation of the X-rays using a set of detectors. A collimator is located upstream of the detectors to reduce the number of unwanted (e.g., scattered) X-rays reaching the detectors that can result in inaccurate measurements of X-ray attenuation. In some embodiments, CT is used to perform non-destructive inspection of components that are formed of relatively high-density materials. As such, relatively high-energy output of an X-ray source is desirable. However, as energy output is increased, the spot size of the X-ray source typically increases. Use of a forward collimator (i.e., a collimator located between the X-ray source and the target) potentially alleviates some of the inaccuracies associated with the attenuation attributable to such larger, higher power output X-ray sources. Additionally, a forward collimator can prevent X-rays not used in a measurement from entering the target area, thus reducing X-ray scatter and incidental exposure.

Figure 1:
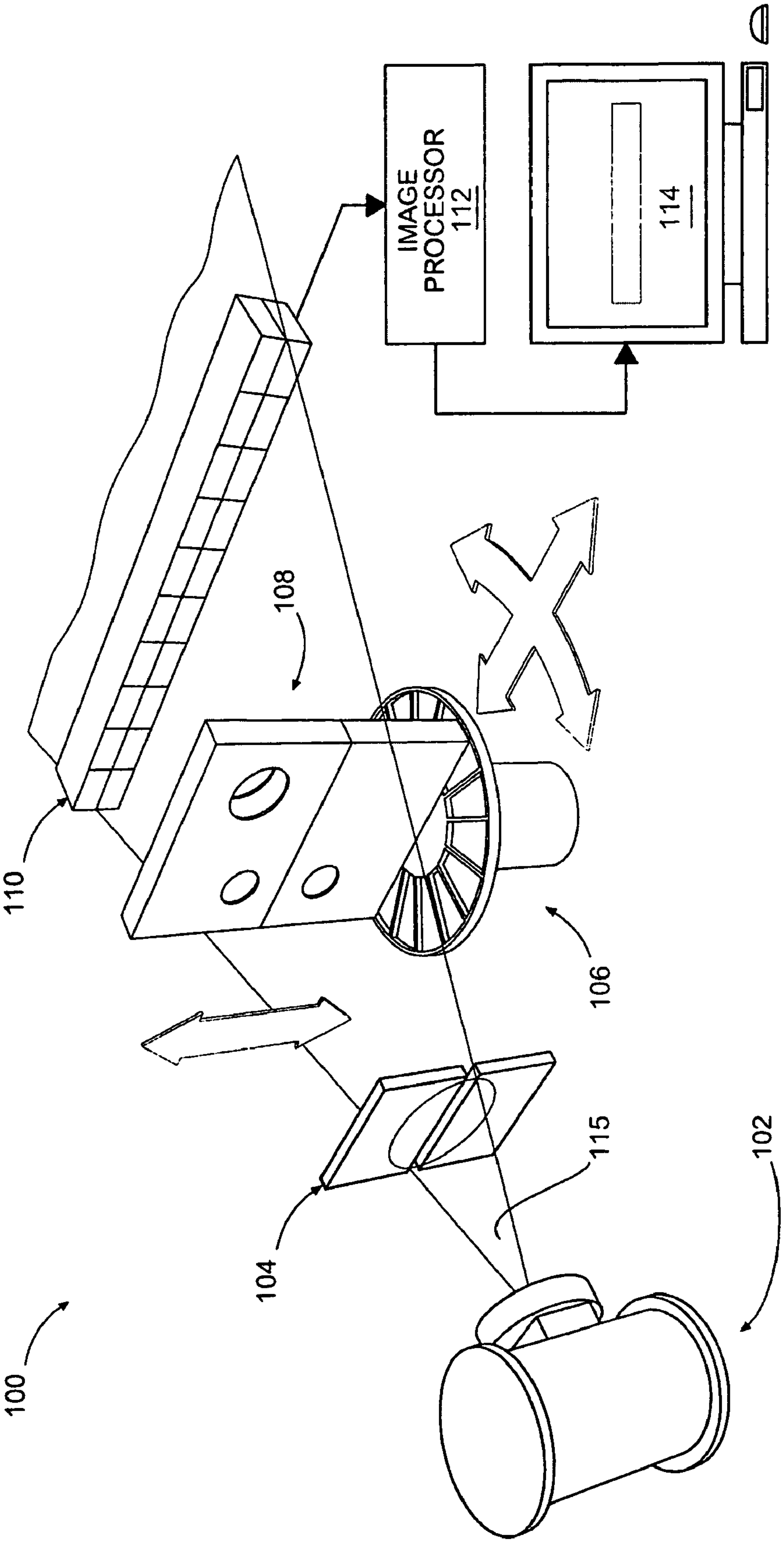
FIG. 1 is a schematic diagram depicting an exemplary embodiment of a system involving a forward collimation.

In this regard, FIG. 1 is a schematic diagram depicting an exemplary embodiment of a system involving forward collimation. As shown in FIG. 1, system 100 includes an X-ray source 102, a forward collimator 104, a turntable 106 on which a target 108 is positioned, a detector array 110, an image processor 112, and a display/analysis system 114. In operation, X-ray source 102 (e.g., a point source) is operative to emit X-rays. In this embodiment, the X-rays are emitted as a fan-shaped beam 115. Notably, source 102 incorporates an integrated source collimator (not shown in FIG. 1) in order to propagate the fan-shaped beam from a housing.

Forward collimator 104 is located downstream of source 102 and is formed of X-ray absorbing materials. In the embodiment of FIG. 1, tungsten is used although, in other embodiments, various other materials can be used such as brass or lead, for example. Details about an exemplary embodiment of a collimator will be described later with respect to FIG. 3.

Turntable 106 is a representative apparatus used for positioning a target, in this case, target 108. In operation, turntable 106 is movable to expose various portions of the target to the X-rays emitted by source 102. In this embodiment, turntable can be used to rotate the target both clockwise and counterclockwise, as well as to raise and lower the target. Altering of a horizontal position of the target in this embodiment is accomplished to expose different heights (e.g., horizontal planes) of the target to the fan-shaped beam. Notably, the elevation of the beam is fixed in this embodiment.

Detector array 110 is positioned downstream of the turntable. The detector array is operative to output signals corresponding to an amount of X-rays detected. In this embodiment, the array is a linear array, although various other configurations can be used in other embodiments.

Image processor 112 receives information corresponding to the amount of X-rays detected by the detector array and uses the information to compute image data corresponding to the target. The image data is provided to display/analysis system 114 to enable user interaction with the information acquired by the detector array.

Figure 2:
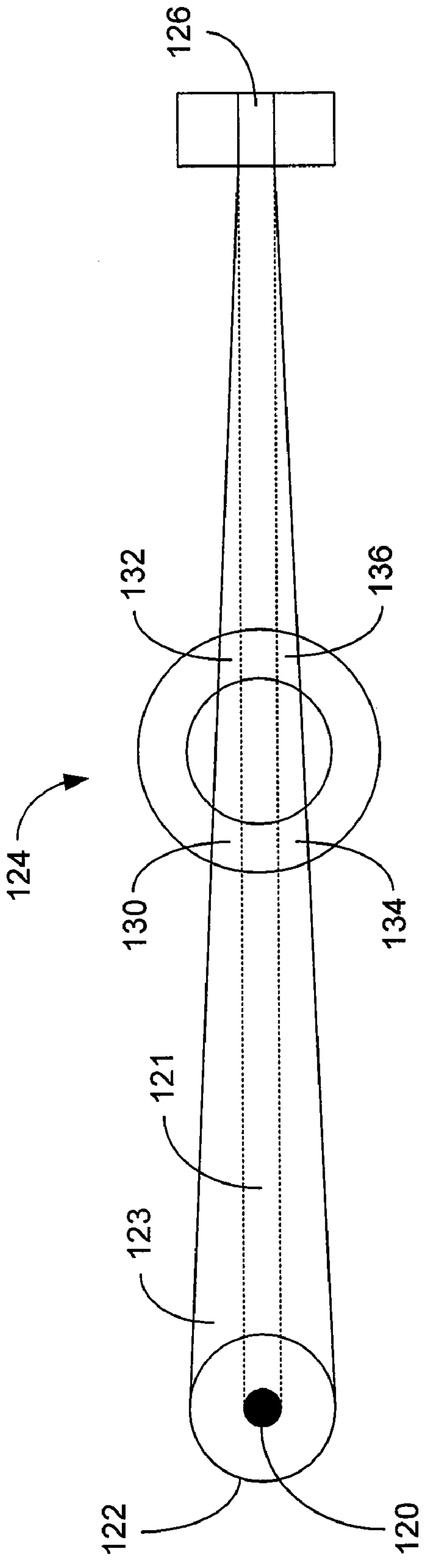
FIG. 2 is a schematic diagram depicting emission of X-rays from an ideal and practical X-ray sources.

FIG. 2 is a schematic diagram depicting emission of X-rays from ideal and practical X-ray sources. As shown in FIG. 2, ideal X-ray source 120 and practical X-ray source 122 are depicted as being co-located for purposes of comparison. A target 124 is positioned downstream of the sources 120, 122, with a detector 126 being located downstream of the target.

X-ray source 120 is ideal in the sense that the width of source 120 directly corresponds to the width of collimation provided at detector 126 as indicated by ray path 121 (indicated by the dashed lines) extending from source 120. In contrast, source 122 is wider than source 120. The ray path 123 (indicated by the solid lines extending from source 122) includes edge rays that pass through target 124 and are incident upon the detector. Areas of divergence (130, 132, 134 and 136) between the edge rays of source 122 and the edge rays of source 120 correspond to false attenuation of the X-rays that can result in inaccurate measurements of the target by the detector. Use of an embodiment of a forward collimator may tend to reduce the degree of such false attenuation.

Figure 3:
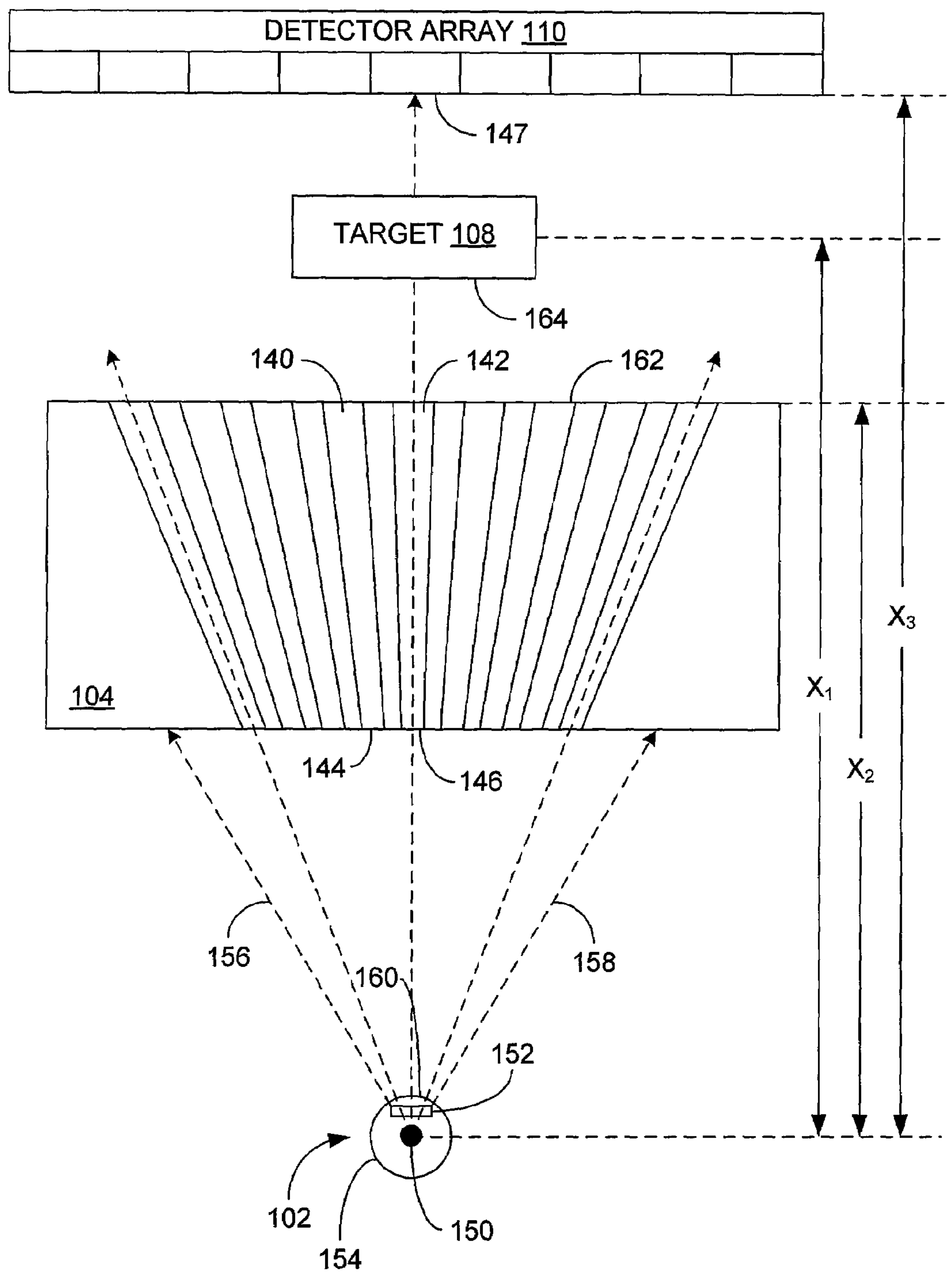
FIG. 3 is a schematic diagram depicting collimator aperture layout of an exemplary embodiment of an X-ray collimator.

In this regard, FIG. 3 is a schematic diagram depicting forward collimator 104 of FIG. 1, showing detail of the collimation provided and positioning relative to various other system components. As shown in FIG. 3, forward collimator 104 includes a fan-shaped array of channels (e.g., channels 140, 142) through which X-rays can pass. Notably, the channels are located through an intermediate portion of the material forming the collimator so that, as viewed from the X-ray source 102, an array of channel apertures (e.g., apertures 144, 146) positioned at the entrance ends of the channels are presented. Material defining the channels is relatively X-ray absorbing, thereby substantially preventing the passage of X-rays through other than the channels.

Also shown in FIG. 3 are X-ray source 102, target 108 and array 110 of detectors. In the embodiment of FIG. 3, a one-to-one correspondence is exhibited between the number of channels of the forward collimator and the number of detectors in the array. This configuration permits each of the channels to be aligned with a corresponding detector. By way of example, channel 142 is aligned with detector 147. In other embodiments, however, such a one-to-one correspondence and/or alignment need not be provided.

Source 102, located upstream of the forward collimator 104, includes an X-ray emitter 150 and an integrated source collimator 152, both of which are positioned within a housing 154. In operation, X-rays emitted from source 102 are directed to the forward collimator 104. However, some of these X-rays are prevented from reaching the target, such as edge rays 156, 158, which are directed from the integrated source collimator and out of the housing via an emission surface 160.

One or more of various factors can influence the selection of system parameters, such as relative distances between components. In this regard, these factors can include, but are not limited to: beam fan angle (e.g., 30 degrees); target size (notably, the target should fit entirely within the selected beam fan angle); forward collimator thickness (e.g., thickness selected to absorb approximately 90% of the X-rays); and collimator channel spacing (e.g., selected to be a minimum of detector maximum diameter).

As shown in FIG. 3, a center of rotation 164 of target 108 is located a distance $X_1$ from source 150. A downstream edge 162 of the forward collimator is located a distance $X_2$ from the center of rotation 164 of target 108. Similarly, the upstream edge of the array of detectors 110 is located a distance $X_3$ from the center of rotation 164 of target 108.

Noting the above, a target with a maximum diameter of approximately 24 inches (609 mm) should be located at a distance ($X_1$) of approximately 46.375 inches (1178 mm) from the source to be positioned within the beam fan. The downstream edge 162 of the forward collimator 104 should clear the rotating target. Therefore, edge 162 should be located at a distance ($X_2$) of approximately 34.375 inches (873 mm) from the source. Similarly, the upstream edge of the array of detectors 110 should be located at a distance ($X_3$) of approximately 58.375 inches (1483 mm) from the source. Clearly, various other dimensions can be used in other embodiments. Notably, this example uses an X-ray source of approximately 450 K volts.

Figure 4:
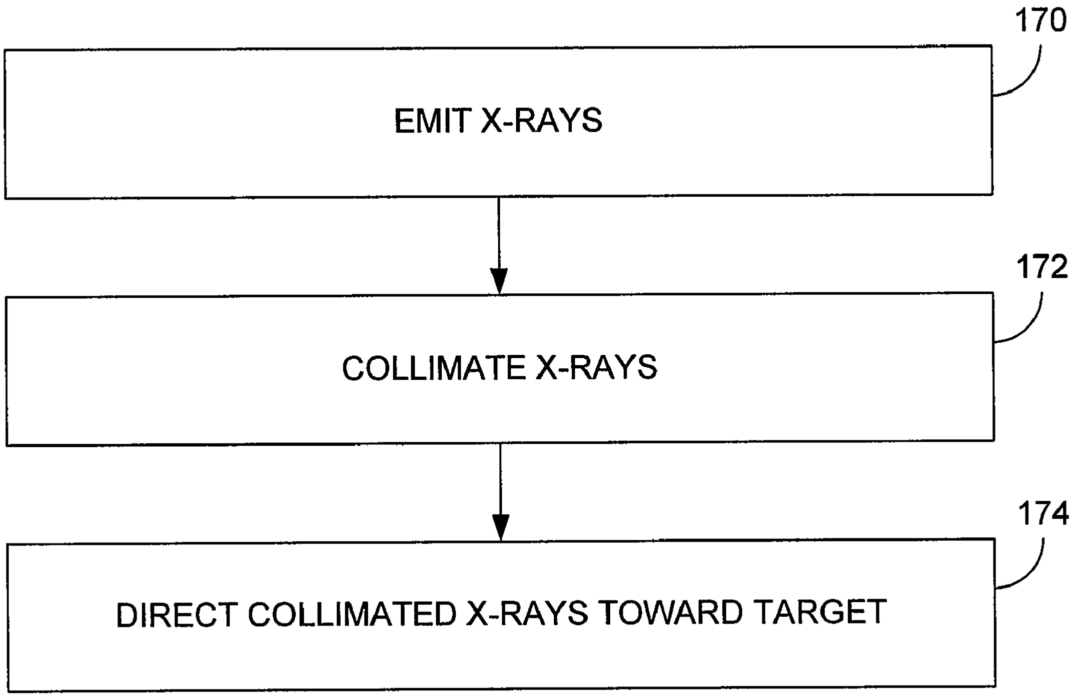
FIG. 4 is a flowchart depicting an exemplary embodiment of a method involving forward collimation.

FIG. 4 is a flowchart depicting an exemplary embodiment of a method involving forward collimation. As shown in FIG. 4, the method may be construed as beginning at block 170, in which X-rays are emitted from a source. In block 172, the X-rays are collimated downstream of the source (e.g., downstream of a housing encasing the source) and prior to being incident upon a target. In block 174, the collimated X-rays are directed at a target, such as for performing non-destructive inspection of the target to determine one or more of various characteristics. By way of example, the characteristics can include, but are not limited to, interior shape and density of the target. In some embodiments, the target can be a formed of metal. Additionally or alternatively, the target can be a gas turbine engine component, such as a turbine blade.

It should be noted that a computing device can be used to implement various functionality, such as that attributable to the image processor 112 and/or display/analysis system 114 depicted in FIG. 1. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A computed tomography system comprising:

a housing defining an interior, which housing includes an X-ray source located within the interior;

a forward collimator positioned downstream of the housing, the forward collimator being formed of X-ray absorbing material with a fan-shaped array of channels formed therethrough, the channels being aligned with the X-ray source; and an array of X-ray detectors located downstream of the forward collimator and operative to output signals corresponding to an amount of X-rays detected;

wherein each channel of the forward collimator is aligned on a one-to-one basis with one of the X-ray detectors such that a portion of the X-rays emitted from the X-ray source are directed through the channels and are incident upon the aligned array X-ray detectors.

2. The system of claim 1, further comprising an image processor operative to receive information corresponding to the amount of X-rays detected and to provide image data corresponding to a target at which the X-rays are directed.

3. The system of claim 1, further comprising an integrated source collimator located within the interior of the housing.

4. The system of claim 1, further comprising a target located downstream of the forward collimator and aligned with the channels such that at least a portion of the X-rays emitted from the X-ray source are directed through the channels and are incident upon the target.

5. The system of claim 1, wherein the X-ray absorbing material is tungsten.

6. The system of claim 1, wherein a distance between the X-ray source and an upstream edge of the forward collimator is between approximately 22 and approximately 60 inches.

7. The system of claim 1, wherein the forward collimator is operative to absorb at least approximately 90% of the X-rays incident thereon.

8. The system of claim 1, wherein the X-ray source outputs approximately 450 K volts.

9. The system of claim 1, wherein the housing is operative to emit X-rays in a fan-shaped beam of approximately 30 degrees in azimuth.

10. A method involving forward collimation of X-rays comprising:

providing an X-ray system having an X-ray source, a forward collimator formed of X-ray absorbing material with a fan-shaped array of channels formed there through, and an array of X-ray detectors operative to output signals corresponding to an amount of X-rays detected, wherein the collimator channels are aligned with the X-ray source, and each of which channels are aligned on a one-to-one basis with one of the X-ray detectors;

emitting X-rays from a housing in which the X-ray source is mounted;

collimating the X-rays downstream of the housing using the collimator channels aligned with the X-ray detectors;

directing the collimated X-rays at a target; and detecting the X-rays passing through the aligned collimator channels and the target.

11. The method of claim 10, further comprising performing computer tomography of the target using the X-rays.

12. The method of claim 10, wherein the target is a metal component.

13. The method of claim 10, wherein the target is a gas turbine engine component.

* * * * *

UNITED STATES PATENT AND TRADEMARK OFFICE

CERTIFICATE OF CORRECTION

PATENT NO. : 7,639,777 B2
APPLICATION NO. : 12/037302
DATED : December 29, 2009

INVENTOR(S) : Rodney H. Warner and Royce McKim

It is certified that error appears in the above-identified patent and that said Letters Patent is hereby corrected as shown below:

Column 5, line 32, please insert --of-- after "array".

Signed and Sealed this

Ninth Day of February, 2010

David J. Kappos

David J. Kappos
*Director of the United States Patent and Trademark Office*